Aug. 20, 1957  C. H. SCHAMEL ET AL  2,803,290
SEAT MECHANISM

Filed Nov. 18, 1952  5 Sheets-Sheet 3

INVENTORS
Clyde H. Schamel &
Claud S. Semar
BY
Willis, Helwig & Baillio
ATTORNEYS

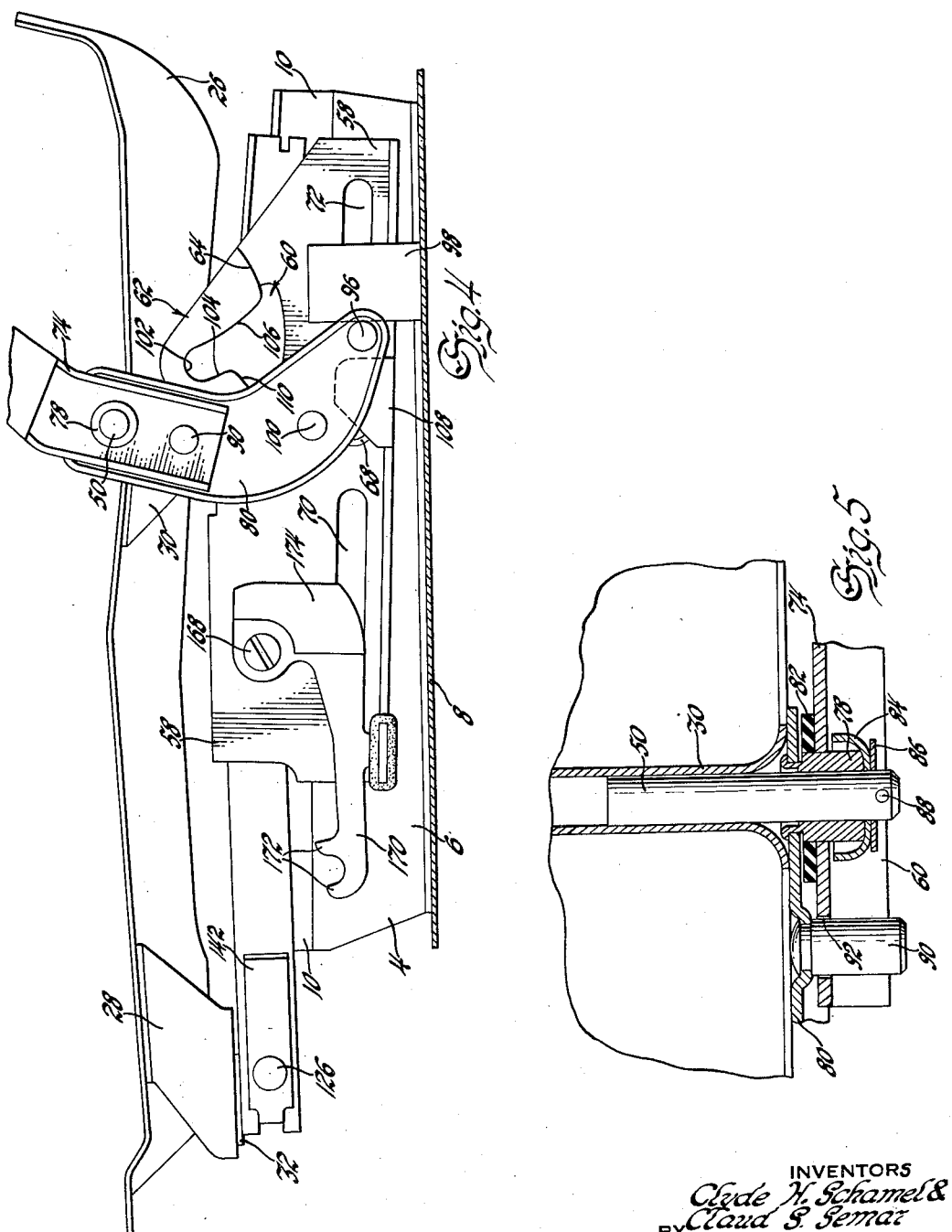

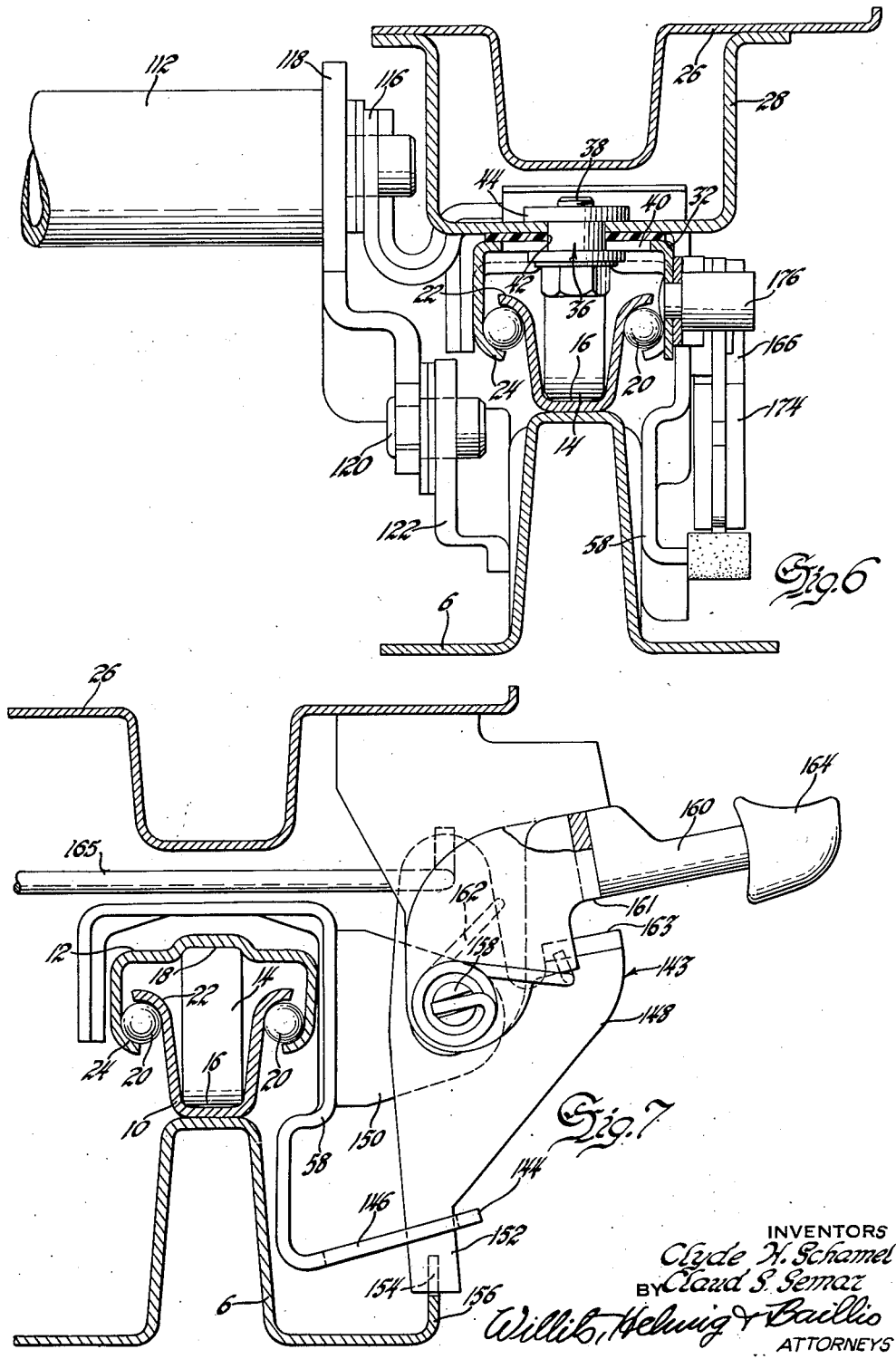

United States Patent Office 2,803,290
Patented Aug. 20, 1957

2,803,290

SEAT MECHANISM

Clyde H. Schamel, Royal Oak, and Claud S. Semar, Birmingham, Mich., assignors to General Motors Corporation, Detroit, Mich., a corporation of Delaware Application November 18, 1952, Serial No. 321,169

16 Claims. (Cl. 155—14)

This invention relates to adjustable seat structures and more particularly although not exclusively to adjustable front seat structures adapted to provide additional space to facilitate entering or leaving the rear seat.

One object of the present invention is to provide an improved adjustable front seat having mechanism responsive to tilting movement of the seat back which is adapted to provide increased space for entrance to and exit from the rear seat.

Another object is to provide a seat which is horizontally swingable in response to tilting movement of either seat back.

Still another object is to provide a seat structure having a horizontally movable seat and a pair of pivotally mounted seat backs which are adapted for tilting movement forwardly and inwardly, the horizontal movement of the seat being responsive to tilting movement of either of the seat backs.

A further object is to provide a split back front seat which is adjustable to a plurality of fixed positions and is temporarily movable in response to tilting motion of either seat back.

Still another object is to provide a seat mechanism of the type described wherein the tilting movement of the seat backs may be accomplished alternately and successively.

A still further object is to provide a seat mechanism of the type described having means preventing yawing of the seat during fore and aft adjustment thereof.

Other objects and advantages of the invention will become more fully apparent from the following description wherein reference is made to the accompanying drawings illustrating preferred embodiments of the invention and wherein similar reference numerals designate similar parts throughout the several views.

In the drawings:

Fig. 4 is a fragmentary side elevational view similar to Fig. 1 showing the relative position of the mechanism when moved to a position permitting entrance to the rear seat.

Fig. 5 is a fragmentary plan view, partly in section, taken generally along the line 5—5 of Fig. 1.

Fig. 6 is an enlarged fragmentary front elevational view, partly in section, of a portion of the adjuster mechanism taken substantially along the line 6—6 of Fig. 1, and Fig. 7 is an enlarged fragmentary front elevational view, partly in section, showing a modification of the invention.

Figure 1:
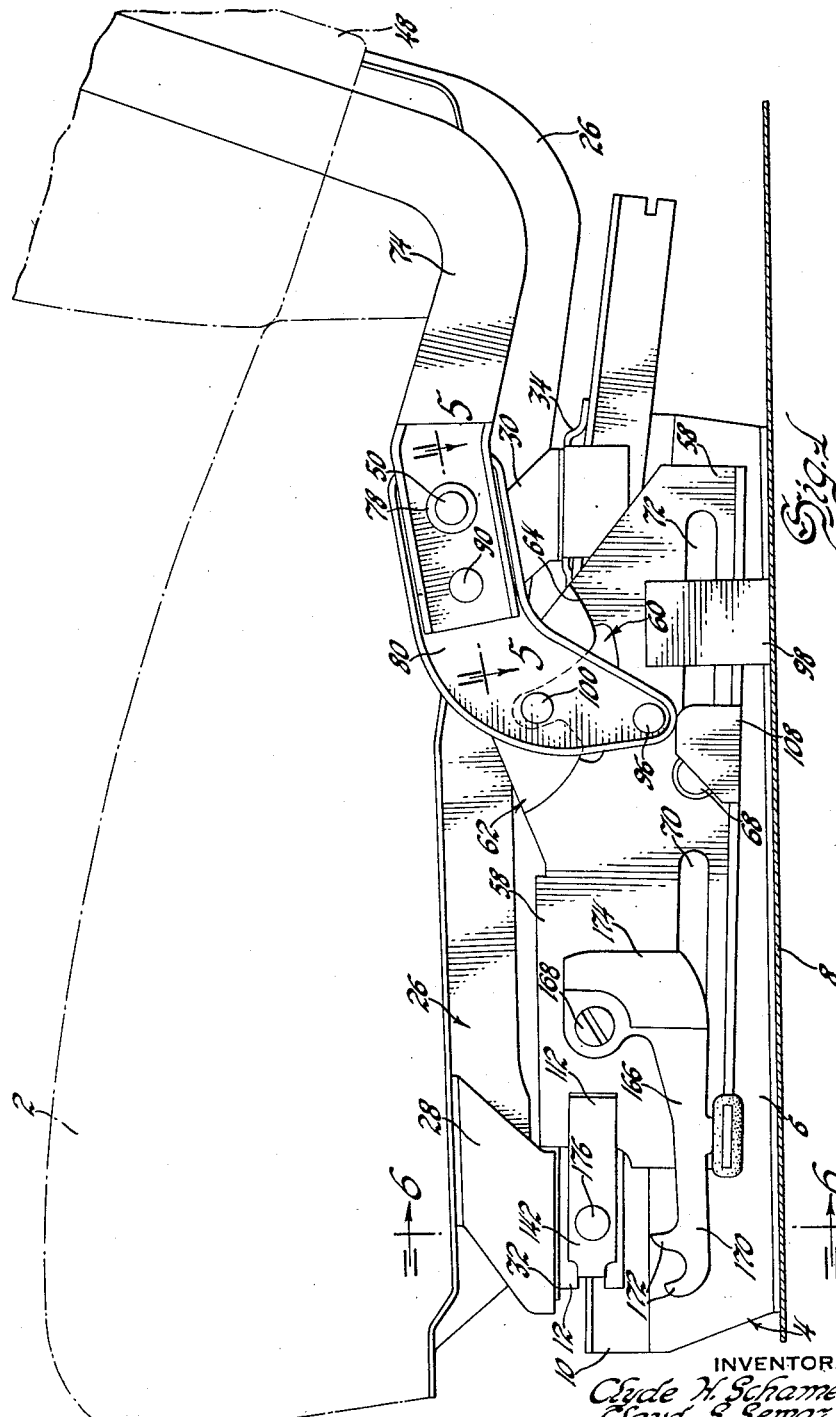
Fig. 1 is a side elevational view, showing the relative disposition of the seat frame, the fore and aft adjuster rails and the traversing mechanism.
Figure 2:
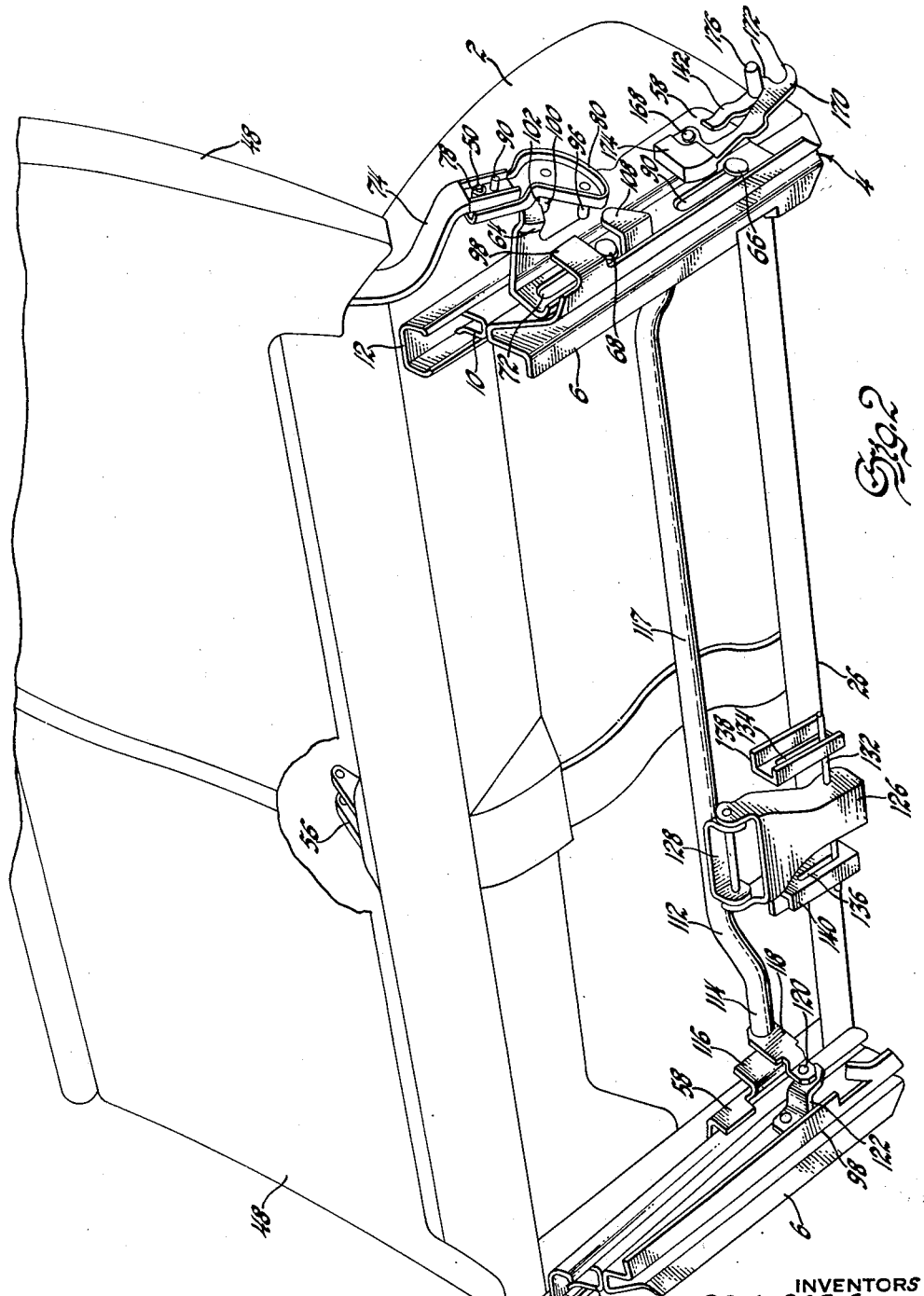
Fig. 2 is a perspective view of the seat assembly, as seen from below showing the structure and arrangement of the parts thereof.
Figure 3:
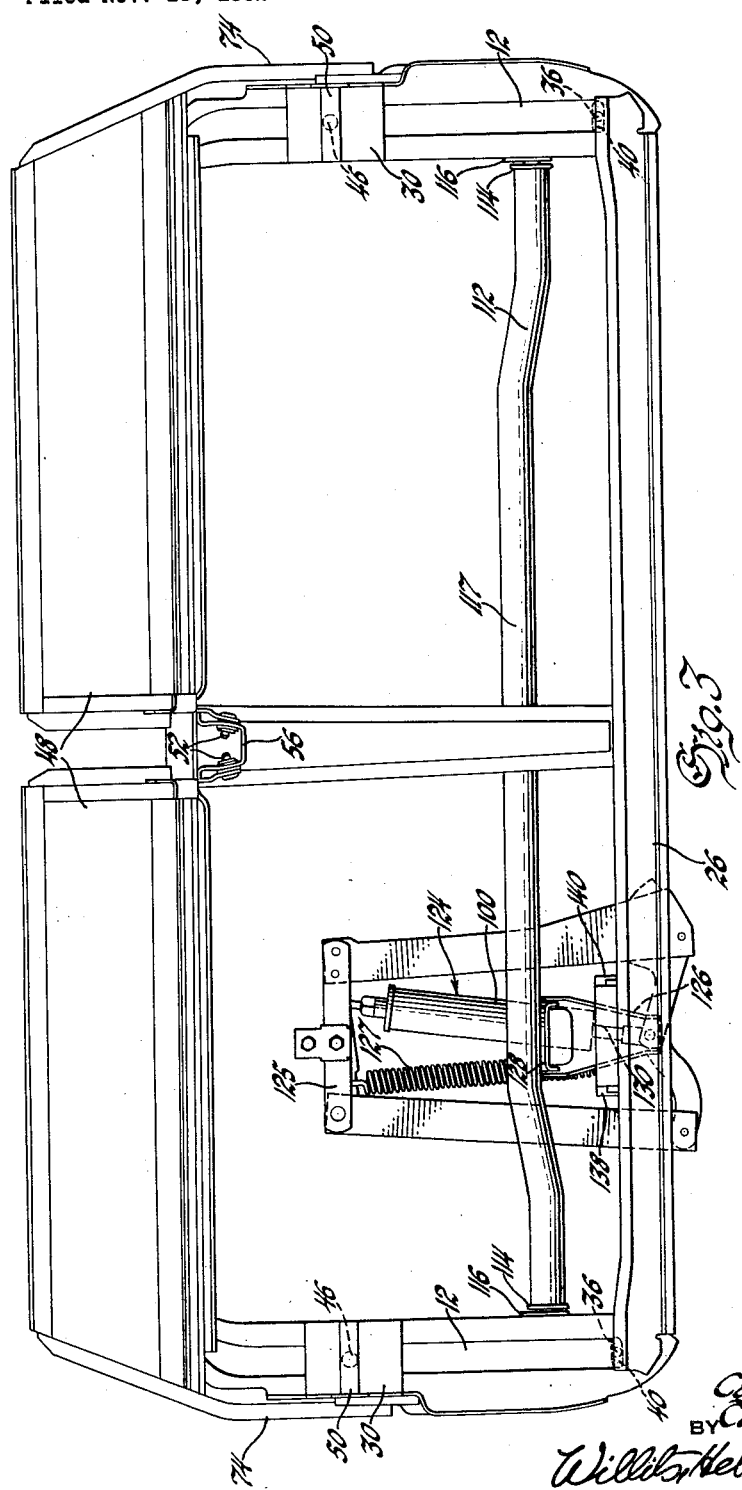
Fig. 3 is a skeletonized plan view showing the seat framework and certain mechanism associated therewith.

Referring now to the drawings and particularly Figs. 1, 2, and 3, there is shown a vehicle seat wherein the numeral 2 designates a bench type seat having a split back 48. Seat 2 extends transversely substantially across the width of the interior of a vehicle and is supported on a pair of spaced apart longitudinally extending adjuster mechanisms 4 which are adapted to provide normal fore and aft adjustment as well as tilting and swinging movement presently to be described. Seat adjusting mechanisms 4 are mounted on the floor 8 of the vehicle adjacent the right and left doors thereof in substantially parallel spaced apart relation to each other and are identical in construction except for minor details to be described later herein. Each mechanism 4 comprises a generally V-shaped longitudinally extending pedestal member 6 which is rigidly secured to the floor 8 and has a generally U-shaped longitudinally extending lower channel member 10 secured along the upper edge thereof by welding or other suitable means. Since mechanisms 4 are identical for both sides of the seat, similar numerals are used to designate similar elements on each side of the seat. Lower channel members 10 serve as fixed guide rails for elongated inverted U-shaped upper channel members 12 which overlie and partially surround said lower channel members and are adapted for longitudinal slidable movement therealong. To assure smooth and silent fore and aft movement of upper channels 12 along lower channels 10, a plurality of rollers 14 (shown in Fig. 6) are disposed between the inner longitudinal surfaces 16 and 18, respectively, thereof. A plurality of ball bearings 20 are disposed at spaced intervals in the longitudinally extending spaces formed by the overlapping edges 22 and 24 of lower channels 10 and upper channels 12, respectively, causing said channels to be maintained in properly spaced relation with each other. It will be seen that in this manner smooth, silent longitudinal movement of upper channel 12 over lower channel 10 is assured while any looseness or rattling is eliminated. To secure seat 2 to upper channels 12, a seat frame 26, constructed of channel section sheet metal, is attached to the base of said seat in any suitable manner. Frame 26 is provided with a pair of spaced apart U-shaped brackets 28 at the front thereof and a second pair of spaced apart U-shaped brackets 30 at the rear. Brackets 28 are pivotally supported on plates 32, mounted on upper channel members 12 near the front ends thereof while U-shaped brackets 30 are pivotally supported on cooperating brackets 34 secured to said channels at the rear thereof. As shown best in Fig. 6, brackets 28 are secured to plates 32, by shouldered upstanding studs 36 having threaded end portions 38. Studs 36 extends through transversely elongated slots 40 formed in upper channel members 12 and through aligned apertures 42 formed respectively in plates 32 and in the base of U-shaped brackets 28. Threaded washers 44, secured in alignment over aperture 42, as by welding, are adapted to threadably engage end portions 38 to secure brackets 28 and upper channel members 12 against axial movement while permitting lateral movement therebetween throughout the limit of the elongated slots 40. Brackets 30 are connected to plates 34 by similar threaded studs 46, or other suitable means (Fig. 3), the connections being different only to the extent that both brackets 30 and cooperating brackets 34 are provided with circular apertures, thereby permitting only pivotal movement therebetween. As seen best in Fig. 3 the seat 2 is swingable horizontally about either pivot 46. When the seat is moved forward at the right side, the left side is retained in a fixed position by a mechanism to be described later herein. When the left side of the seat is moved forward the operation is reversed. Therefore, when the seat 2 pivots about either pivot 46, one of the upper channels 12 remains stationary while the other moves forward along its cooperating lower channel 10. It will therefore be seen that the provision of longitudinally extending slots 40 in plates 32 permits lateral movement of the studs 36 relative to upper channels 12 and eliminates binding which would otherwise result. Since limited lateral movement also takes place with reference to the stud 46 on the forward moving channel 12, the circular apertures provided in U-shaped brackets 34 may also be slightly elongated in said brackets. However, because of the extremely limited inward movement resulting from swinging the cushion arcuately, this provision is not absolutely necessary.

As seen particularly in Fig. 3, a pair of seat backs 48 is pivotally supported in a substantially vertical position near the rear edge of the seat 2 on outer trunnions 50 and inner trunnions 52, respectively. Trunnions 50 are secured to the brackets 30 formed on the seat frame 26 while trunnions 52 are secured to a bracket 56 also mounted on said frame. Brackets 30 are disposed along the outer edges of seat frame 26 intermediate the forward and rear edges thereof while brackets 56 are disposed near the rear central portion of said frame and at a point located above said brackets 30. It will therefore be seen that each seat back is mounted for swinging movement about an inclined axis extending rearwardly and upwardly relative to the transverse center line of the seat, whereby the seat backs 48 swing forwardly and inwardly when tilted.

In order to render the seat 2 longitudinally swingable upon tilting movement of either of the seat backs 48, a pair of relatively flat generally rectangular cam plates 58 are slidably mounted on the outer surfaces of pedestal members 6. Cam plates 58 have formed therein generally triangular cutouts 60 and are provided with outwardly offset portions 62 defining downwardly facing curved walls 64. Plates 58 are slidably mounted on pedestals 6 by means of outwardly extending studs 66 and 68 rigidly secured to the said pedestals in spaced apart relation and which extend outwardly through elongated slots 70 and 72 formed in said cam plates. Plates 58 are longitudinally movable fore and aft along pedestals 6 by means of a conventional hydraulic seat adjuster in a manner to be described later herein. A hinge arm 74 is secured to the outer side of each seat back 48 and extends downwardly and forwardly and is rotatably secured on a bushing 78 of a hinge arm extension 80 which in turn is rotatably mounted on trunnion 50. As shown in Fig. 5, a resilient washer 82 is provided on each bushing 78 between extension 80 and hinge arm 74. After both of the extensions 80 and hinge arms 74 are assembled in position on trunnions 50, caps 84 and washers 86 are placed in position and secured thereon by cotter keys 88 disposed in apertures provided near the outer ends. As previously described, hinge arm 74 inclines inwardly as seat back 48 is tilted forwardly. To enable extensions 80 to rotate in planes parallel to cam plates 58, the hinge arms 74 and said extensions 80 are pivotally connected, as shown in Fig. 5, by transversely extending studs 90 secured to the said extensions and extending through apertures 92 formed on said hinge arms. With this arrangement it will be seen that each hinge arm 74 will drive its extension 80 through its circular path of movement but the said hinge arm is free, by virtue of the flexible connection, to angle inwardly as the associated seat back 48 is tilted.

Near their extreme outer ends, arm extensions 80 are provided with inwardly projecting studs 96 which are adapted to engage rigidly mounted struck-up projections 98 upon forward tilting movement of the seat backs 48. Directly above studs 96 extensions 80 are provided with additional rigidly secured studs 100 which extend inwardly into the triangular cutout portions 60 formed in the cam plate 58. Cut out portions 60 terminate at their upper ends in upwardly inclined reduced portions 102 into which the studs 100 extend when the seat backs are in normal position. As seen particularly in Fig. 1, when the seat backs 48 are in normal substantially vertical position any forward movement of the seat will cause the stud 100 to bear against the forward inclined edges 104 of reduced portions 102 and thus prevent further forward movement of the seat.

As shown best in Fig. 4, when either seat back is tilted forwardly, its associated outer hinge arm 74 causes the extension 80 connected thereto to swing rearwardly about trunnion 50 bringing the stud 96 into engagement with the struck up projection 98 while the stud 100 initially moves in a rearward path defined by the rear edge 106 of cut out portion 60. Following initial forward swinging movement of the seat back 48, struck up projection 98 arrests further rearward movement of said stud 96, and consequently additional swinging movement of the seat back 48 reacts on trunnion 50 to impart forward movement to the seat 2. Inasmuch as the seat is secured to and is movable with upper channel 12, further tilting movement of seat back 48 causes the seat to move in an arc generated from the opposite rear pivotal connection 46 until the seat back 48 has reached its forward limit of tilting movement. Upon reversal of the tilting movement of the seat back 48, the stud 96 swings forwardly with extension 80 and engages a projection 108 formed on and extending upwardly from the lower edge of cam plate 58. Upon engagement of the stud 96 with the projection 108, forward swinging movement of stud 96 is arrested and continued rearward tilting of the seat back 48 causes the seat to move rearwardly in a horizontal arc, thereby carrying upper channel member 12 longitudinally rearwardly along lower channel 14 until the seat has regained its original transversely aligned position. During the rearward movement of the seat and the rearward tilting movement of the seat back, stud 100 on extension 80 travels rearwardly and upwardly with reference to the cam plate 58 until the stud is in substantial alignment with cutout 60. Near the final increment of tilting movement of the seat back 48, stud 96 disengages projection 108 as stud 100 engages the forward edge 110 of cutout portion 60 to cam the seat rearwardly the remaining distance and brings the stud 100 into the inclined reduced portion 102 formed in said cutout to retain the seat against forward movement.

To prevent yawing when the seat is moved fore and aft to its various fixed positions of adjustment, the seat mechanism is provided with a longitudinally extending equalizer mechanism which is operable only during fore and aft adjustment of the seat to its various fixed positions of adjustment. As best seen in Fig. 2 a transversely extending tubular member 112 has its opposite ends 114 pivotally mounted on inwardly extending bent up supporting portions 116 formed integrally on cam plate 58. Tubular member 112 is formed with an offset mid-portion 117 and the ends 114 have rigidly secured thereto downwardly depending leg portions 118. Legs 118 are pivotally connected by studs 120 to links 122 which are in turn pivotally connected to pedestal members 6. As shown in Fig. 3, a hydraulic actuator 124, operated by convenient controls, not shown, previously mentioned, is pivotally connected to a fixed cross member 125 and extends forwardly therefrom and the plunger 130 thereof engages a bracket 126 pivotally connected to a second bracket 128 which in turn is rigidly secured to the offset portion 117 of equalizer bar 112. As shown in Fig. 3, when the hydraulic actuator is operated, forward thrust is applied by plunger 130 to bracket 126 which forces equalizer bar 112 forward. A powerful spring 127 connected between cross member 125 and bracket 126 operates to return the seat to the normal position when the actuator control is moved to the proper position. For a more complete description such a hydraulic mechanism reference may be had to U. S. 2,590,450, Parsons. Since the equalizer bar 112 is pivotally attached to supports 116 on each cam plate 58, forward movement of said bar causes concurrent forward movement of the cam plates 58 by arms 118 throughout the limit of elongated slots 70 and 72. Since legs 118 on the equalizer bar are connected to pivotal links 122, forward movement of the equalizer bar is accompanied by rotation thereof in the supports 116. The integral legs 118, therefore, must rotate at the same rate at each end of the equalizer bar, since unequal rate of rotation will place the bar 112 in torsion.

As seen best in Fig. 2, pivotally mounted bracket member 126 has secured thereto and extending laterally from either side thereof a rod 132. The ends of rod 132 extend into slots 134 and 136 formed in channel members 138 and 140, respectively, secured to the lower front edge of seat frame 26. Rod 132 prevents vertical rise or rotation of bracket member 126 when thrust is applied thereto by the hydraulic actuator 124 while permitting horizontal arcuate movement of the seat 2 when seat backs 48 are tilted. It will therefore be seen that the seat equalizer mechanism is operable to assure equalized rate of travel fore and aft when the seat is adjusted to its various fixed positions, but does not affect alternate swinging movement of the seat in response to tilting of either seat back 48.

Since the cam plate 58 is slidably secured to pedestals 12 only by the studs 66 and 68, it will be apparent that under certain conditions plate 58 would be subject to rattling. To eliminate this tendency a heavy gauge spring clip 142 is rigidly secured to the forward outer edge of upper channel 12 and is adapted to bear firmly against the forward outer surface of the cam plate 58 when the seat is in the normal position. Since cam plate 58 is stationary when the seat back is tilted, clip 142 moves out of engagement with plate 58 whenever the seat back 48 is tilted.

In Fig. 7 there is shown a modification of the invention having a manually operable latch 143 which is adapted to retain the seat in its various longitudinal positions of adjustment. In the modification, the lower edge of cam plate 58 is provided with a laterally offset horizontally extending portion 144 having a relatively long laterally extending slot 146 formed therein. A blade member 148 is pivotally supported on a bracket 150 secured to the cam plate 58. Blade 148 is provided with a downwardly extending finger portion 152 which extends downwardly through the slot 146 and is adapted to enter into any one of a plurality of vertical slots 154 longitudinally spaced apart in a struck up portion 156 of pedestal 6. A latch arm 160 and blade 148 are coaxially journaled on a stud 158 secured on bracket 150. Arm 160 and blade 148 are biased in a counterclockwise direction by means of spring 162 to urge finger portion 152 in a counter clockwise direction toward the outer extremity of slot 146, thereby positioning the finger 152 in engagement with one of the slots 154. Arm 160 has an abutment 161 thereon adapted to engage a projection 163 on blade 148 when the said arm is moved downwardly. It will be seen that by depressing the thumb engaging portion 164 of latch arm 160, arm 160 and blade 148 will be rotated clockwise against the spring 162 causing the finger portion 152 to swing inwardly toward the inner extremity of slot 146 thereby withdrawing the finger extension 152 from engagement with the slot 154 in struck up portion 156, and thus permitting the cam plate 58 to be moved fore and aft relative to the lower channel 10 and pedestal 6. When the seat has been adjusted to the desired position, manual pressure on the thumb engaging portion 164 is released, permitting the finger projection 152 to swing outwardly in response to spring 162 and into engagement with the notch 154 corresponding with the position of adjustment of the seat. A similar mechanism, not shown, is provided on the opposite side and is coincidentally operable by means of a transversely extending rod 165. It will be understood that in this modification the seat is manually moved fore and aft to the desired position of adjustment after the latch 143 has been depressed.

In order to more fully understand the invention a description of the mode of operation will be given. It will be apparent that when only one seat back 48 is tilted forward, as for instance, the left seat back, the right side of the seat will be retained in a fixed position of adjustment shown in Fig. 1, due to the holding action effected by engagement of stud 100 in the forwardly and upwardly inclined reduced portion 102 in the cam plate cut out 60. Therefore as the left seat back 48 is tilted forwardly, the seat swings in a horizontal arc about the right rear pivot connection 46. As the seat pivots about the right rear pivot 46, both front pivot studs 36 and left rear pivotal stud 46 travel in arcs generated by the right rear pivot 46. Thus, the entire seat rotates about pivot 46 causing the right front portion of the seat to swing laterally outwardly while the entire left side swings forwardly and inwardly. Since the slots 40 in plates 32 of upper channels 12 provide for lateral movement of pivots 36 outwardly in either direction, it will be seen that when the left seat back 48 is tilted forwardly the pivot studs 36, respectively, move to the outer-most limit of slot 40 on the left side and approximately the inner most limit of slot 40 on the right side. It will, of course, be apparent that when the right seat back is tilted forward, the mode of operation is identical except in the reverse sense. As pointed out previously, when either seat back 48 is swung forwardly the seat back arm extension 80 swings downwardly about trunnion 50. Since trunnion 50 moves progressively forward as the seat travels in the horizontal arc, it will be seen that inwardly projecting stud 96 travels in a generally downward and backward direction relative to trunnion 50. Therefore, when seat back 48 is tilted rearwardly to return the seat to the normal position, stud 96 is vertically displaced downwardly sufficient to provide engagement with outwardly extending projection 108 on the cam plate 58 during the greater portion of the return swinging movement of extension 80. However, as the seat and seat back approach the normal transversely aligned position the trunnion 50 carried thereon has again moved rearwardly until it approaches the normal position wherein the arc described by the stud 96 clears the projection 108. Therefore the stud 96 swings out of engagement with the projection 108 just before the seat assumes its normal position. However, since the stud 100 has been concurrently moving backwardly, it has moved into a position adjacent the triangular cutout portion 60 and engages the forward edge 110 of the cutout 60 to urge the seat to the full rearward position. During its final increment of arcuate movement stud 100 moves upwardly into the reduced portion 102 of slot 60 to lock the seat assembly against forward movement along lower channel 10.

As previously described, fore and aft adjustment of the seat to its various positions of adjustment is accomplished by longitudinal movement of the cam plates 58 along the pedestal members 6. Since the studs 100 are confined in the reduced portions 102 of cam plates 58 to retain the seat in fixed positions relative to the cam plate, it will be apparent that regardless of the adjusted longitudinal position of the cam plates, the seat will normally be retained in a position paralleling the transverse axis of the vehicle, by virtue of the holding action of studs 100 in notches 102 on both sides of the seat mechanism. However, since the struck up projections 98 are fixed with relation to the floor of the vehicle, as the seat proper is moved toward the forward positions of adjustment, the studs 96 on extensions 80 move progressively away from projections 98. Therefore, when the seat proper is in a forward fixed position of adjustment a progressively increasing degree of lost motion occurs between the initial forward tilting of either seat back and the engagement of projection 98 by stud 96. However, it is manifest that when the seat is retained in a forward position of adjustment, less horizontal swinging movement of the seat is required in order to obtain the desired clearance for entrance to or exit from the rear seat. Therefore, although the horizontal swinging movement of the seat begins after either seat back 48 has been partially tilted forward, the total increased space available for entrance to the rear seat will be substantially the same regardless of the permanent position of adjustment of the seat.

Since the seat is movable in response to tilting movement of either seat back, it is desirable that means be provided for preventing forward movement of the seat as a result of tilting motion of either seat back 48 induced by sudden deceleration of the vehicle. To this end there is provided a latch arm 166 which is pivotally secured near the front of the cam plate 58 on a pivot shaft 168. Latch arm 166 is of generally L-shaped configuration and is provided with a horizontally extending arm portion 170 having a plurality of struck up catches 172 formed on the upper edge thereof. At its rear edge, latch 166 is provided with suitable weights 174 which are adapted to maintain latch 166 in a horizontally extending position when acted upon by the force of gravity only. However, in the event that the vehicle is rapidly decelerated, the force of inertia causes the forward extension 170 to swing upwardly to place one of catches 172 in engagement with a stud 176 (Fig. 1) secured on the upper channel 12, thereby resisting any forward movement of the seat along the lower channels 10. For a more complete description of the foregoing latch mechanism reference may be had to the co-pending application of Claud S. Semar entitled Seat Construction, S. N. 321,170, filed November 18, 1952, now Patent No. 2,737,229, granted March 6, 1956.

From the foregoing description it will be seen that the invention provides an improved and highly novel vehicle seat. In addition to providing greatly increased entrance space to the rear seat of a vehicle from either side, the mechanism is so constructed as to be operable when both doors of the vehicle are closed. The device employs, for the most part, conventional seat structure commonly used in production passenger vehicles and such additional parts as are required for the most part simple in construction and easily fabricated.

While the embodiments of the present invention herein disclosed constitutes preferred forms thereof, it is to be understood that other changes and modifications may be made therein without departing from the invention. It is to be understood, therefore, that it is not intended to limit the invention to the single embodiment disclosed herein but only by the scope of the claims which follow.

We claim:

1. A seat structure comprising, a seat portion and a pair of tiltable back portions disposed in side by side relation, supporting means for said seat structure, means for swinging said seat structure in one direction upon tilting one of said back portions, means for swinging said seat structure in the opposite direction upon tilting of the other of said back portions, each of said last mentioned means comprising fixed abutment means on said supporting means engageable by said back portions, and acceleration responsive means for preventing tilting of each of said back portions.

2. In a seat structure for a vehicle body, the combination of a pair of spaced apart pedestal members, guide means supported on each of said pedestal members, a seat having a pair of forwardly and inwardly tiltable seat backs pivotally mounted on said pedestal members, means for connecting said seat and said guide means including pivotal means permitting lateral swinging movement of said seat relative to said guide means, and means on said seat backs engageable with said pedestal members whereby tilting movement of either seat back imparts substantially horizontal swinging movement to the said seat.

3. A seat having tiltable back portions pivoted thereon, guide mechanisms for said seat, said seat being longitudinally adjustable to a plurality of fixed positions fore and aft on said mechanisms, fixed abutment means, means on said back portions adapted to engage said abutment means to move said seat longitudinally from its fixed position in response to tilting movement of either said back, said means being adapted to provide progressive reduction of said longitudinal movement when said seat is progressively adjusted forwardly on said mechanisms.

4. A seat, a tiltable back portion for said seat, a guide mechanism supporting said seat, seat adjuster means on said guide mechanism, a hinge arm on said back portion, pivot means securing said arm to said seat, a projection on said arm, a fixed abutment, a second abutment on said adjuster means, said projection being adapted to engage said fixed abutment upon forward tilting movement of said seat back to swing said seat substantially horizontally in a forward direction and to engage said second abutment upon rearward tilting of said seat back to swing said seat substantially horizontally in a rearward direction to its normal position.

5. A seat, a normally upright tiltable back portion for said seat, a guide mechanism for said seat, a fixed abutment, movable adjuster means on said mechanism for securing said seat in a plurality of fixed positions longitudinally of said mechanism, means for imparting fore and aft movement to said seat comprising a hinge arm for said back portion, pivot means securing said hinge arm to said seat, an extension secured to said hinge arm, a stud formed on said extension and engageable with said fixed abutment upon tilting movement of said seat back, and a second stud formed on said extension engageable with said ajuster means to retain said seat in any of its fixed positions of adjustment when said seat back is in its normal position.

6. In a seat structure for a vehicle body, the combination of a pair of spaced apart pedestal members, guide means supported on each of said pedestal members, each of said guide means comprising a fixed rail and a cooperating slidable rail, a seat, a supporting frame for said seat, a pair of forwardly tiltable seat backs pivotally mounted on said frame, means connecting said frame to said slidable rails for movement therewith, said connecting means including means permitting limited swingable movement of said seat in either direction relative to said slidable rails, and extended means on each of said pivotal seat backs adapted to engage said pedestal members whereby tilting movement of either of said seat backs imparts substantially horizontal swinging movement to said seat.

7. In a seat structure for a vehicle body, the combination of a pair of spaced apart pedestal members, guide means supported on each of said pedestal members, each of said guide means comprising a fixed rail and a cooperating slidable rail, a seat, a supporting frame for said seat, a pair of tiltable seat backs pivotally mounted on said frame for forward and inward swinging movement, means connecting said frame to said slidable rails for movement therewith, said connecting means including means permitting limited swingable movement of said seat in either direction relative to said slidable rails, and extension means on each of said pivotal seat backs adapted to engage said pedestal members whereby tilting movement of either of said seat backs imparts horizontal swinging movement to said seat.

8. In a seat structure for a vehicle body, the combination of a pair of spaced apart pedestal members, guide means supported on each of said pedestal members, each of said guide means comprising a fixed rail and a cooperating slidable rail, a seat, a supporting frame for said seat, a pair of tiltable seat backs pivotally mounted on said frame, said seat backs being tiltable forwardly and inwardly from a normal upright position, means connecting said frame and each of said slidable rails for movement with the latter, said connecting means including means adapted to permit limited swingable movement of said seat in either direction relative to said slidable rails, stud means carried by each of said seat backs engageable with said each of said pedestal members whereby forward tilting movement of either seat back swingably displaces said seat forwardly, means on said pedestal members to permit slidable adjustment of said seat to a plurality of fixed positions along fixed rail, and means on said last mentioned means engageable by said stud means whereby forward tilting movement of said seat backs swingably displaces said seat forwardly.

9. A seat structure for a vehicle body comprising, a seat having normally upright forwardly and inwardly tiltable back portions, a pair of guide mechanisms for said seat disposed beneath the ends thereof, each guide member including one element slidable relative to the other, means pivotally connecting the ends of said seat to said slidable elements, means carried by said back portions and adapted to engage said guide mechanisms for retaining said slidable elements in lateral alignment when both of said seat backs are in said normal upright position, said last mentioned means being disengageable responsive to forward tilting movement of either of said back portions.

10. A seat structure for a vehicle body comprising a seat having normally upright forwardly and inwardly tiltable back portions, a pair of longitudinal guide mechanisms for said seat disposed beneath the ends thereof, each guide member including one element slidable relative to the other, means pivotally connecting each end of said seat to one of said slidable elements, means carried by said back portions and adapted to engage said guide mechanisms for retaining said slidable elements in lateral alignment when both of said seat backs are in said normal position, said last mentioned means being disengageable responsive to forward tilting movement of either of said back portions, and additional means carried by said back portions adapted to urge said seat forward in a horizontal arcuate path in response to forward tilting of either of said back portions.

11. A seat structure for a vehicle body, comprising a seat having pivotally mounted tiltable back portions adapted to swing forwardly and inwardly from a substantially upright position, a pair of substantially parallel spaced apart guide mechanisms for said seat mounted beneath the ends thereof, each guide mechanism including a slidable rail and a fixed rail, a pair of upstanding studs secured on each of said slidable rails at opposite ends thereof, a supporting frame for said seat having apertures formed therein cooperating with said upstanding studs, one of said apertures on each side of said support being laterally elongated to permit limited swingable movement of said seat relative to said slidable rails, an upright abutment secured on each of said fixed rails, seat adjusting members slidably disposed on each of said fixed rails, means for retaining said members in a plurality of slidably adjustable positions, means associated with said back portions whereby slidable adjustment of said members determines the longitudinal position of said seat relative to said fixed rails when said seat backs are in their normal upright position, and additional means on said members adapted to engage said abutments whereby said seat may be temporarily moved forward from its fixed position of adjustment in response to tilting movement of one or both of said back portions, and means on said adjusting members for equalizing the movement of said slidable rails during fore and aft adjustment thereof to said fixed positions of adjustment.

12. In a seat structure for a vehicle, the combination of a seat having tiltable seat backs pivotally mounted thereon for forward and inward movement, guide mechanisms providing fore and aft movement of said seat, means pivotally connecting said seat on said guide mechanisms, manually operable adjusting means on said guide mechanisms for securing said seat in a plurality of positions within the range of said fore and aft movement, fixed abutments on said guide mechanisms, relatively movable abutments connected to said guide mechanism, means on said seat backs responsive to the tilting movement of either seat back to engage either of said abutments for temporarily swinging said seat forward at the side adjacent the seat back being tilted, said means being further responsive to the rearward tilting of either of said seat backs to return the seat to the initial adjusted position.

13. In a seat structure for a vehicle, the combination of a seat having tiltable seat backs pivotally mounted thereon for forward and inward movement, guide mechanisms providing fore and aft movement of said seat, means pivotally connecting said seat on said guide mechanisms, manually operable adjusting means on said guide mechanisms for securing said seat in a plurality of positions within the range of said fore and aft movement, fixed abutments on said guide mechanism, relatively movable abutments connected to said guide mechanism, means on said seat backs responsive to the tilting movement of either seat back to engage either of said abutments for temporarily swinging either seat forward at the side adjacent the seat back being tilted, said means being further responsive to the rearward tilting of either of said seat backs to return the seat to the initial adjusted position, and means pivotally secured to said guide mechanisms to prevent forward movement of said seat when said vehicle is rapidly decelerated.

14. The structure defined in claim 12 wherein said means on said seat backs comprises hinge arms, extensions coaxially journaled with said hinge arms, and studs secured on said extensions adapted for swinging engagement with said fixed abutment in one direction and swinging engagement with said relatively movable abutments in the other direction.

15. A seat, forwardly and inwardly tiltable back portions pivotally mounted on said seat, guide mechanisms for said seat, movable adjuster means on said guide mechanisms for securing said seat in a plurality of fixed positions longitudinally of said mechanism, and means for imparting temporary longitudinal swinging movement to said seat, said last mentioned means being so constructed and arranged as to provide progressively decreasing temporary longitudinal movement of said seat as said seat is progressively moved toward its forward fixed positions of adjustment.

16. The structure defined in claim 15 including equalizer means operable only during movement of said adjuster means to prevent unequal movement along said guide mechanisms.

References Cited in the file of this patent

UNITED STATES PATENTS

| | | |
|---|---|---|
| 2,129,952 | Lustig | Sept. 13, 1938 |
| 2,160,015 | Haberstump | May 30, 1939 |
| 2,189,396 | Greig | Feb. 6, 1940 |
| 2,428,217 | Hedley et al. | Sept. 30, 1947 |
| 2,492,107 | Orton | Dec. 20, 1949 |
| 2,557,313 | Quilter | June 19, 1951 |
| 2,563,220 | Doty | Aug. 7, 1951 |
| 2,591,426 | Hadley | Apr. 1, 1952 |
| 2,618,312 | Bradley | Nov. 18, 1952 |
| 2,658,209 | Travis | Nov. 10, 1953 |
| 2,660,223 | Appleton | Nov. 24, 1953 |
| 2,681,688 | Haltenberger | June 22, 1954 |

FOREIGN PATENTS

| | | |
|---|---|---|
| 172,163 | Great Britain | Dec. 8, 1921 |